United States Patent
Matsumoto et al.

(10) Patent No.: US 8,963,993 B2
(45) Date of Patent: Feb. 24, 2015

(54) IMAGE PROCESSING DEVICE CAPABLE OF GENERATING WIDE-RANGE IMAGE

(75) Inventors: Kosuke Matsumoto, Akishima (JP); Naotomo Miyamoto, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 346 days.

(21) Appl. No.: 13/437,427

(22) Filed: Apr. 2, 2012

(65) Prior Publication Data

US 2012/0257007 A1    Oct. 11, 2012

(30) Foreign Application Priority Data

Apr. 6, 2011   (JP) ................................ 2011-084383

(51) Int. Cl.
*H04N 7/00*     (2011.01)
*H04N 5/232*    (2006.01)
*G03B 37/04*    (2006.01)

(52) U.S. Cl.
CPC ............ *H04N 5/23238* (2013.01); *G03B 37/04* (2013.01)
USPC .......................................................... 348/36

(58) Field of Classification Search
USPC .......................................................... 348/36
See application file for complete search history.

(56) References Cited

U.S. PATENT DOCUMENTS

| | | | |
|---|---|---|---|
| 7,561,788 B2 | 7/2009 | Kobayashi et al. | |
| 8,041,207 B2 | 10/2011 | Sasaki et al. | |
| 8,068,694 B2 | 11/2011 | Zhang et al. | |
| 8,542,946 B2 | 9/2013 | Zhang et al. | |
| 2003/0044060 A1* | 3/2003 | Martins | 382/154 |
| 2004/0189849 A1* | 9/2004 | Hofer | 348/333.03 |
| 2007/0030358 A1* | 2/2007 | Aoyama | 348/231.2 |
| 2007/0058961 A1 | 3/2007 | Kobayashi et al. | |
| 2007/0237423 A1* | 10/2007 | Tico et al. | 382/284 |
| 2008/0253687 A1* | 10/2008 | Zhang et al. | 382/284 |
| 2012/0092522 A1 | 4/2012 | Zhang et al. | |

FOREIGN PATENT DOCUMENTS

| | | |
|---|---|---|
| JP | 11-069293 A | 3/1999 |
| JP | 2000101895 A | 4/2000 |
| JP | 2002-090820 A | 3/2002 |
| JP | 2004-191897 A | 7/2004 |
| JP | 2004-228711 A | 8/2004 |

(Continued)

OTHER PUBLICATIONS

Taiwanese Office Action dated Jan. 17, 2014 (and English translation thereof) in counterpart Taiwanese Application No. 101111970.

(Continued)

*Primary Examiner* — Allen Wong
(74) *Attorney, Agent, or Firm* — Holtz, Holtz, Goodman & Chick PC

(57) ABSTRACT

A digital camera according to the present invention includes a CCD, an image display section, and a CPU. The CPU controls the CCD to perform consecutive image-capturing, and generates a wide-range image based on a plurality of images consecutively captured by the CCD. In addition, the CPU detects a predetermined trigger indicating the completion of consecutive image-capturing in a predetermined direction by the CCD. Furthermore, the CPU displays on the image display section information indicating a range to be consecutively captured by the CCD to generate a panoramic image, while changing the information every time the predetermined trigger is detected.

8 Claims, 14 Drawing Sheets

(56) References Cited

FOREIGN PATENT DOCUMENTS

| | | | |
|---|---|---|---|
| JP | 2005-027142 | A | 1/2005 |
| JP | 2005-057548 | A | 3/2005 |
| JP | 2007-81473 | A | 3/2007 |
| JP | 2008098754 | A | 4/2008 |
| KR | 2007-0097273 | A | 10/2007 |
| KR | 2010-0082303 | A | 7/2010 |

OTHER PUBLICATIONS

Korean Office Action dated Jun. 20, 2013 (and English translation thereof) in counterpart Korean Application No. 10-2012-0035627.

Japanese Office Action dated Apr. 1, 2014 (and English translation thereof) in counterpart Japanese Application No. 2011-084383.

Japanese Office Action dated Jul. 22, 2014 issued in counterpart Japanese Application No. 2011-084383.

* cited by examiner

FIG. 2
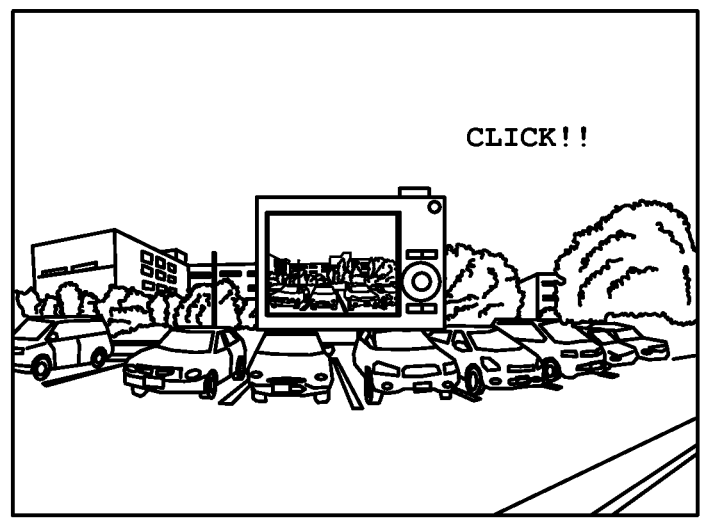
NORMAL IMAGING MODE
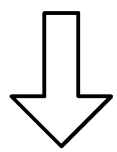
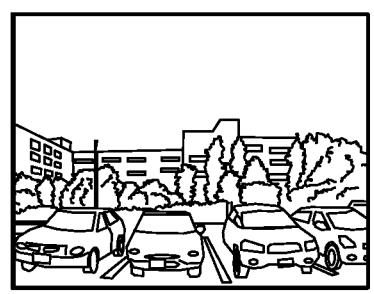
CAPTURED IMAGE

FIG. 3
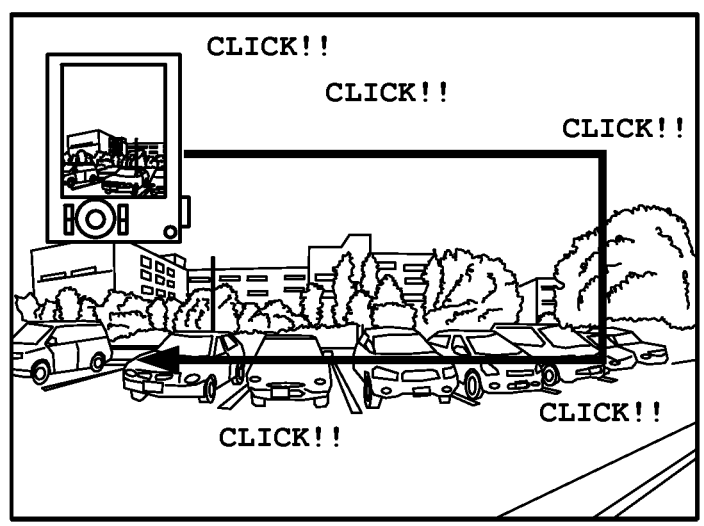
PANORAMIC IMAGING MODE
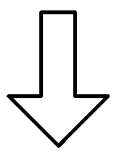
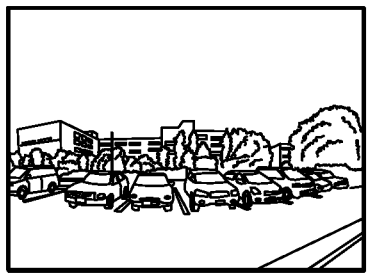
CAPTURED IMAGE

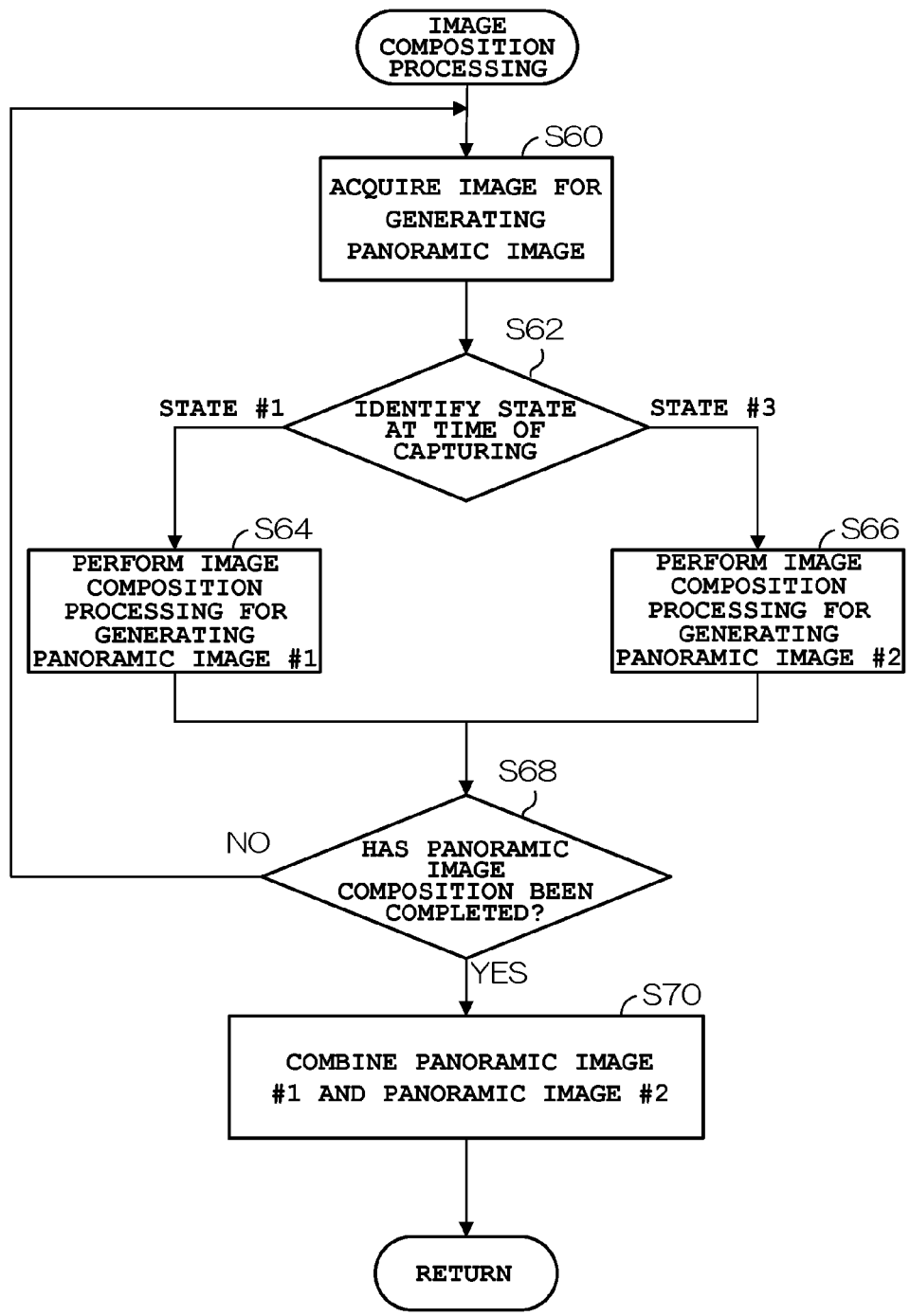

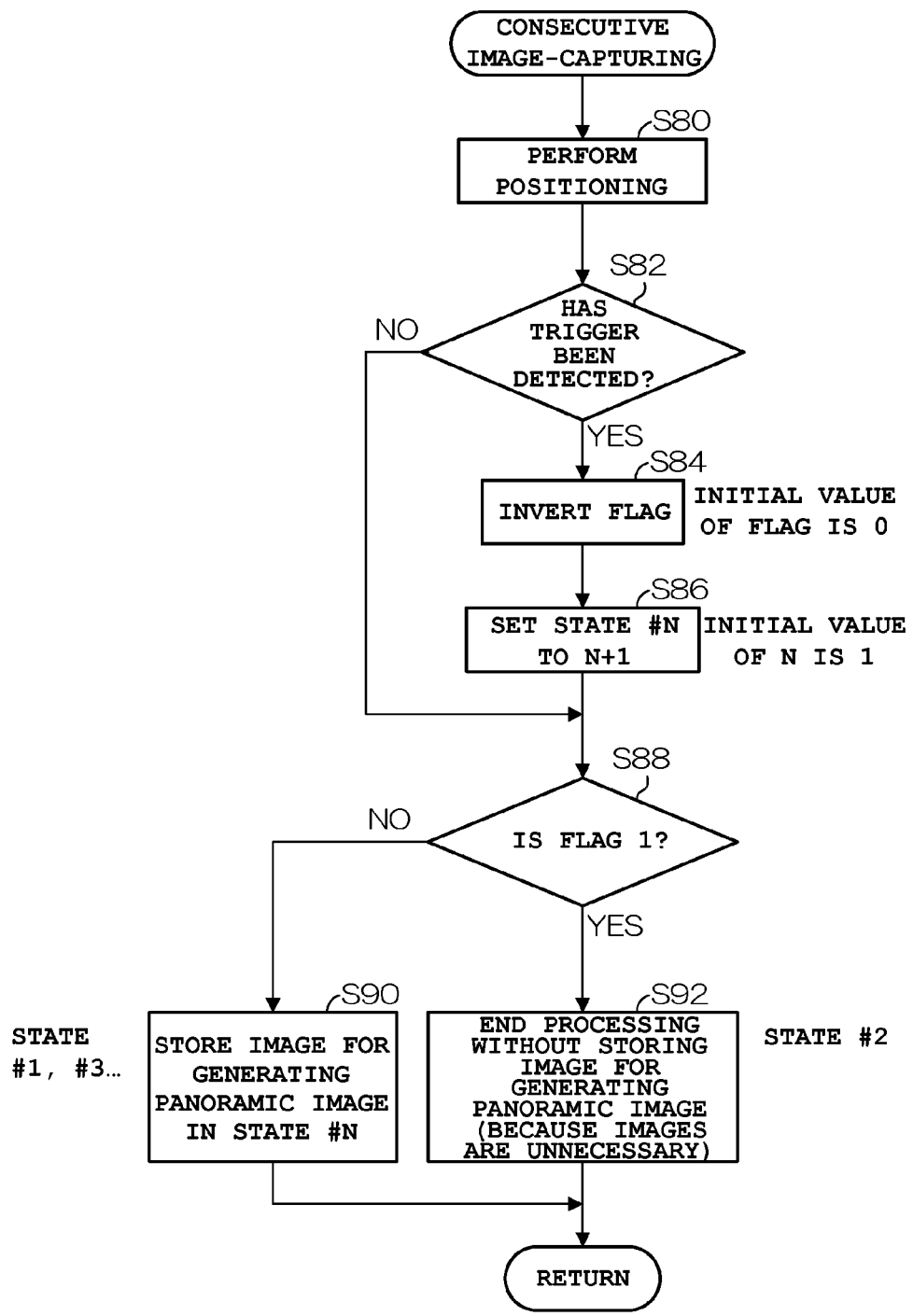

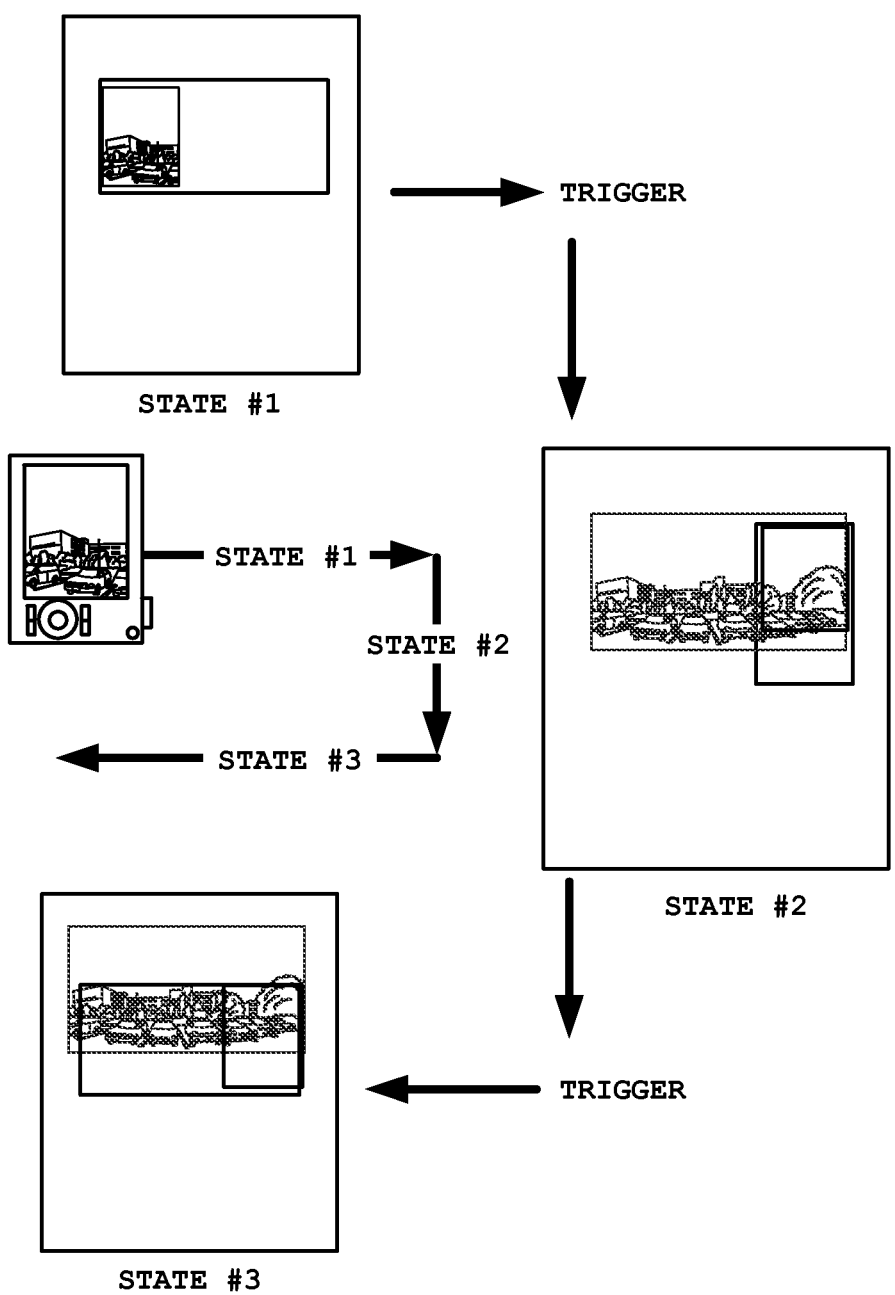

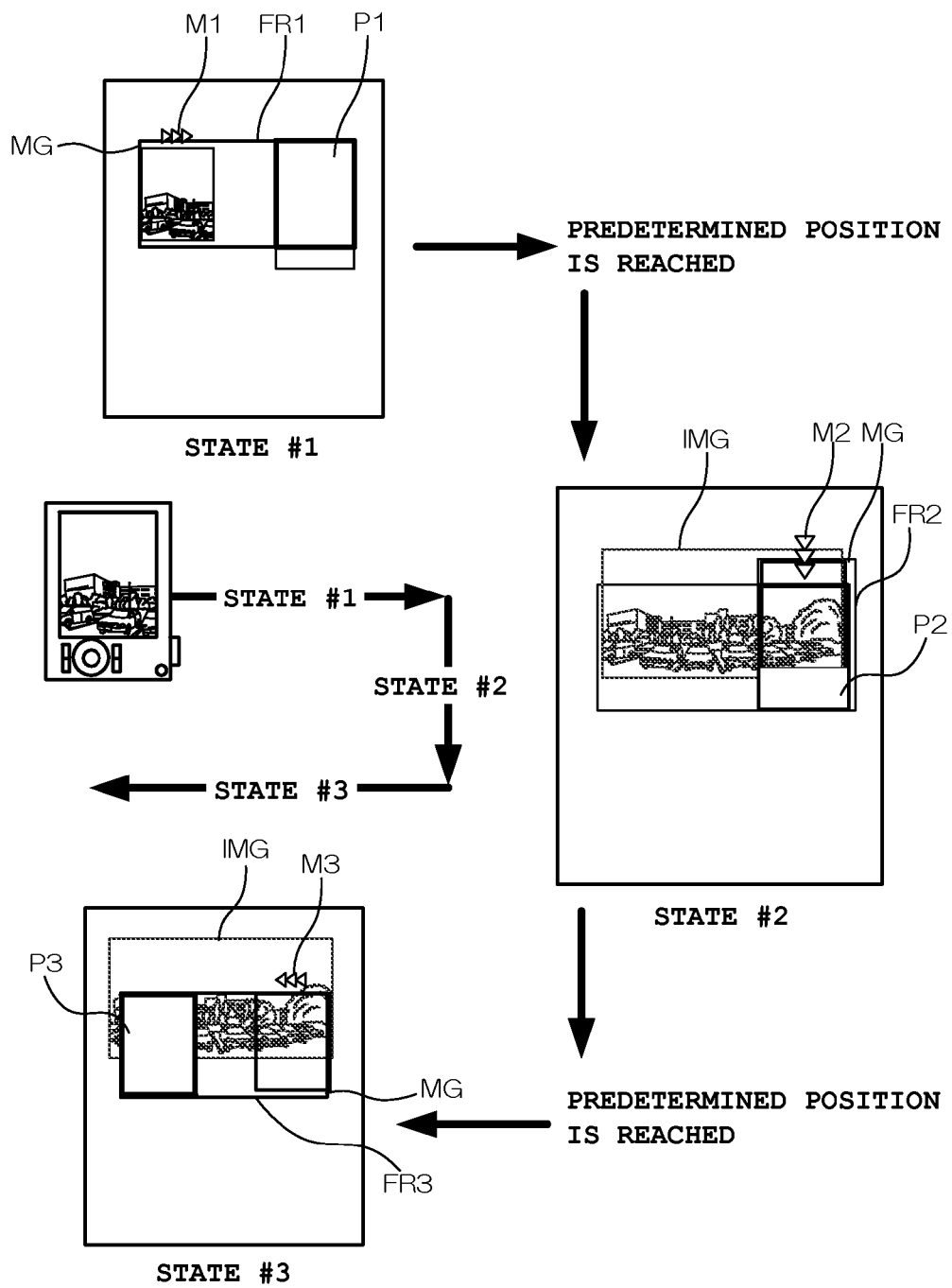

IMAGE PROCESSING DEVICE CAPABLE OF GENERATING WIDE-RANGE IMAGE

CROSS-REFERENCE TO RELATED APPLICATION

This application is based upon and claims the benefit of priority from the prior Japanese Patent Application No. 2011-084383, filed Apr. 6, 2011, the entire contents of which is incorporated herein by reference.

BACKGROUND OF THE INVENTION

1. Field of the Invention

The present invention relates to an image processing device such as a digital camera or a mobile phone having an imaging function, an image processing method, and a recording medium.

2. Description of the Related Art

In digital cameras, mobile phones having an imaging function, etc., the limit of a viewing angle is dependent on the hardware specification of the device body, such as the focal distance of the lens, the size of the image sensor, and the like. As a solution to the problem of this viewing angle limit, a conversion lens for wide-range imaging or the like is attached in front of a preexisting lens in an imaging apparatus (for example, refer to Japanese Patent Application Laid-Open (Kokai) Publication Nos. 2004-191897, 2005-027142, and 2005-057548), or a plurality of lenses are provided in advance and the lenses are switched depending on the intended imaging operation (for example, refer to Japanese Patent Application Laid-Open (Kokai) Publication No. 2007-081473).

However, in the above-described conventional technologies, the conversion lens for wide-range imaging is required to be attached or the lenses are required to be switched depending on the intended imaging operation, every time wide-range imaging is performed. Accordingly, there are problems regarding operability and costs. In addition, even with conversion lenses for wide-range imaging or switchable lenses, the user still has difficulty in acquiring a desired wide-range image.

SUMMARY OF THE INVENTION

An object of the present invention is to provide an image processing device, an image processing method, and a recording medium capable of easily and efficiently acquiring images required to generate a wide-range image, without performing lens replacement.

In order to achieve the above-described object, in accordance with one aspect of the present invention, there is provided an image processing device comprising: an imaging section; a display section; an imaging control section which controls the imaging section to perform consecutive image-capturing; a wide-range image generating section which generates a wide-range image based on a plurality of images consecutively captured by the imaging section; a detecting section which detects a predetermined trigger indicating completion of consecutive image-capturing in a predetermined direction by the imaging section; and a display control section which displays on the display section information indicating a range to be consecutively captured by the imaging section, while changing the information every time the predetermined trigger is detected.

The present invention has an advantage in that images required to generate a wide-range image are easily and efficiently acquired without lens replacement.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram for explaining a normal imaging mode;

FIG. 3 is a conceptual diagram for explaining the panoramic imaging mode of the digital camera 1 according to the first embodiment;

FIG. 7 is a flowchart for explaining the operation of image composition processing by the digital camera 1 according to the first embodiment;

FIG. 9 is a flowchart for explaining the operation of consecutive image-capture processing by a digital camera 1 according to a second embodiment;

FIG. 10 is a conceptual diagram for explaining the operation of the consecutive image-capture processing by the digital camera 1 according to the second embodiment;

FIG. 12 is a conceptual diagram for explaining the operation of the consecutive image-capture processing by the digital camera 1 according to the third embodiment;

DETAILED DESCRIPTION OF THE PREFERRED EMBODIMENTS

The preferred embodiments of the present invention will hereinafter be described with reference to the drawings.

A. First Embodiment

A-1. Configuration of the First Embodiment

Figure 1:
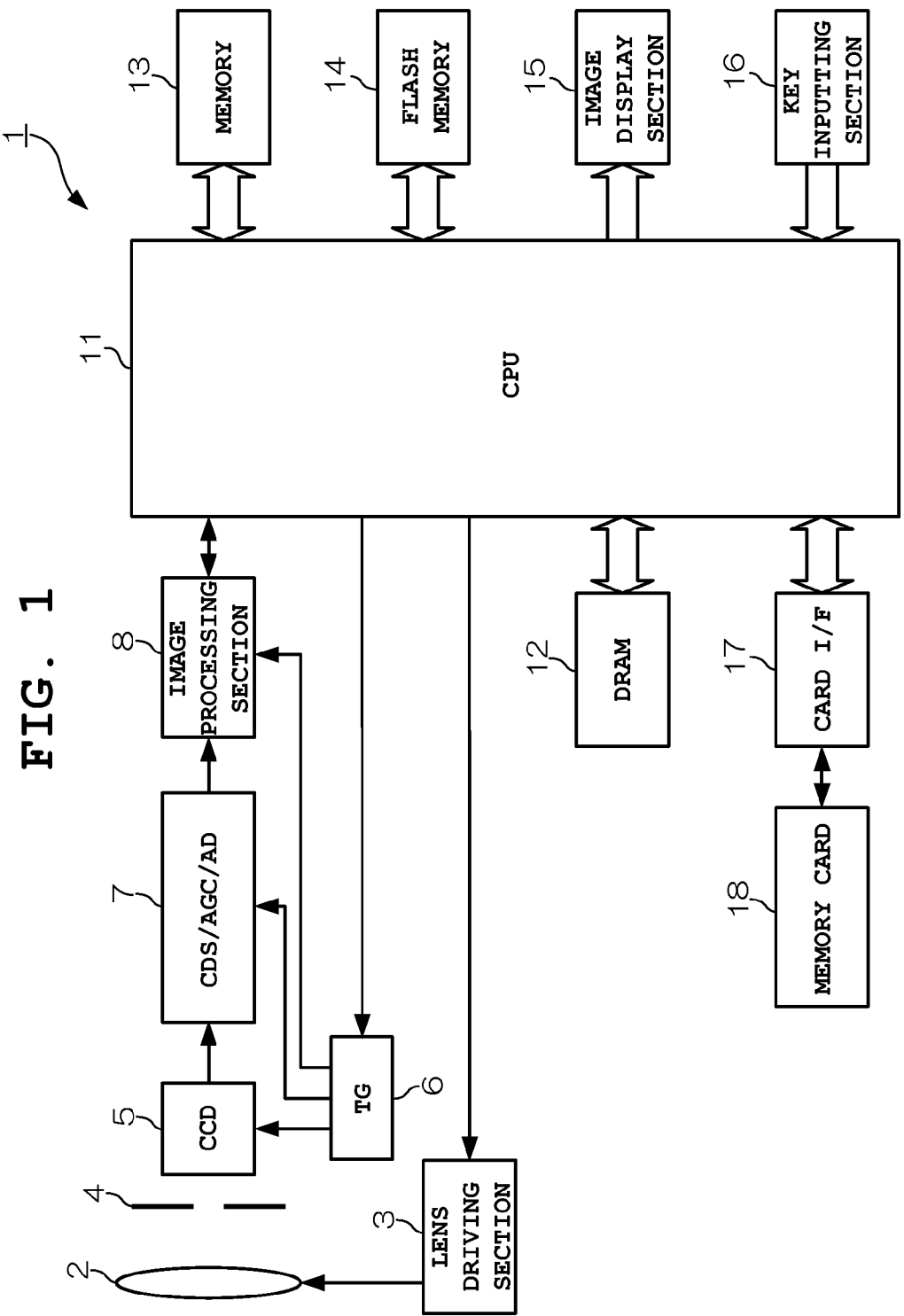
FIG. 1 is a block diagram showing the structure of a digital camera 1 according to a first embodiment of the present invention.

FIG. 1 is a block diagram showing the structure of a digital camera 1 according to a first embodiment of the present invention. In FIG. 1, the digital camera 1 includes an imaging lens 2, a lens driving section 3, a shutter-aperture 4, a charge-coupled device (CCD) 5 (imaging section), a timing generator (TG) 6, a unit circuit 7, an image processing section (wide-range image generating section, panoramic image generating section, auxiliary composite image generating section), a central processing unit (CPU) 11 (imaging control section, display control section, detecting section), a dynamic random access memory (DRAM) 12, a memory 13, a flash memory 14, an image display section 15 (display section), a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5, which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format or Moving Picture Experts Group (MPEG) format), processing for combining a plurality of captured images, etc.

The CPU 11 is a single-chip microcomputer that controls each section of the digital camera 1. In particular, according to the first embodiment, the CPU 11 controls each section such that a plurality of images are consecutively captured at a predetermined cycle (time interval) while the user is moving the digital camera 1, the captured images are combined in a manner that they are partially overlapped with each other (such as by α-blending), and a single composite image that appears to have been captured at a wide angle is generated. The details of this image composition will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 includes a color liquid crystal display (LCD) and a driver circuit thereof. In an imaging stand-by state, the image display section 15 displays a subject captured by the CCD 5 as a real-time image. Also, the image display section 15 displays a recorded image that has been read out from the flash memory 14 or the memory card 23 and expanded when it is replayed. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

FIG. 2 is a conceptual diagram for explaining a normal imaging mode. As shown in FIG. 2, when capturing in a normal imaging mode, the digital camera 1 can only capture an image with the viewing angle S of the imaging system in the digital camera 1.

Figure 4:
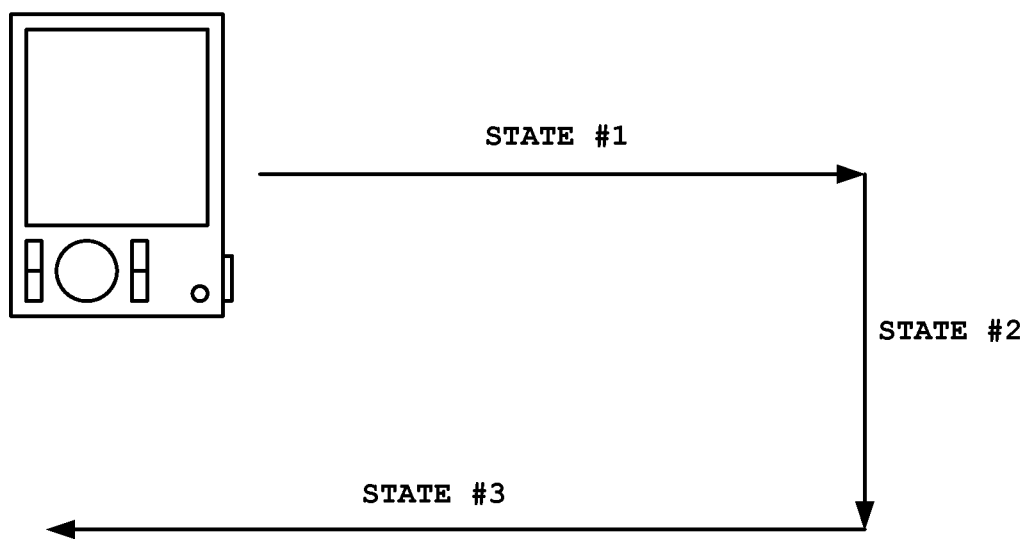
FIG. 4 is a conceptual diagram for explaining movements of the digital camera 1 (movements made by the user) in the panoramic imaging mode of the digital camera 1 according to the first embodiment.

FIG. 3 is a conceptual diagram for explaining the panoramic imaging mode of the digital camera 1 according to the first embodiment. FIG. 4 is a conceptual diagram showing movements of the digital camera 1 (movement made by the user) in the panoramic imaging mode of the digital camera 1 according to the first embodiment.

In this mode, the user aims the digital camera 1 at a recording target landscape by holding it in the vertical direction such that the longer side of the viewing angle is in the vertical direction, and depresses (half-depression to full depression) the shutter SW at the upper left end of the recording target landscape. Then, as indicated by the arrow in FIG. 3, the user moves the digital camera 1 towards the right from the left end when the shutter SW has been depressed (see state #1 in FIG. 4), and after moving it downward at a predetermined position (see state #2 in FIG. 4), moves it towards the left at another predetermined position (see state #3 in FIG. 4). While the user is making this movement, the digital camera 1 consecutively captures images at predetermined timings.

Next, the digital camera 1 generates a first panoramic image from a plurality of images captured in state #1 while the digital camera 1 is being moved towards the right from the left end, and after generating a second panoramic image from a plurality of images captured in state #3 while the digital camera 1 is being moved towards the left from the right end, ultimately generates a desired wide-range image (lower side in FIG. 3) by combining the first panoramic image and the second panoramic image. Note that images captured in state #2 while the digital camera 1 is being moved downward are not stored, because these images are not necessary to generate a panoramic image.

A-2 Operations of the First Embodiment

Next, operations of the above-described first embodiment will be described.

Figure 5:
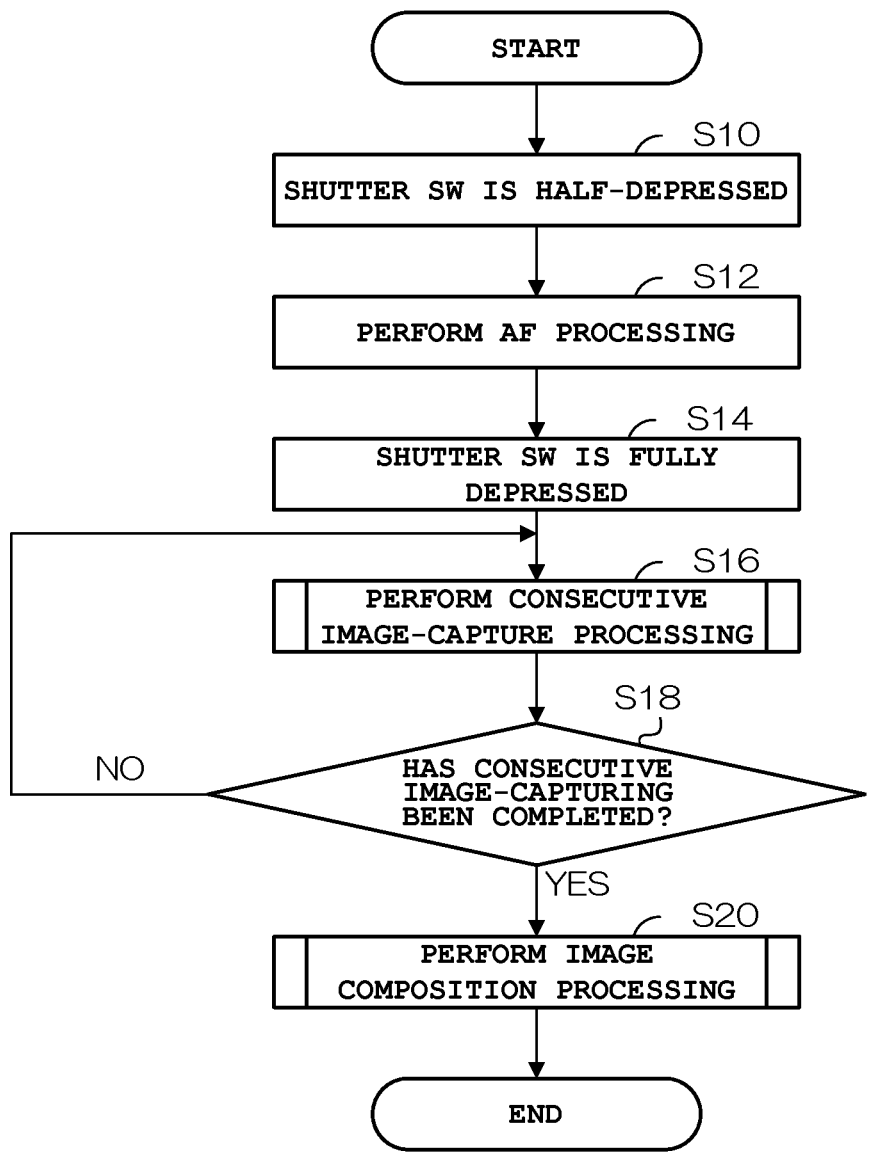
FIG. 5 is a flowchart for explaining operations of the digital camera 1 according to the first embodiment.

FIG. 5 is a flowchart for explaining operations of the digital camera 1 according to the first embodiment. First, when the user half-depresses the shutter SW (Step S10), the CPU 11 performs auto-focusing (AF) (Step S12). Then, when the user fully depresses the shutter SW (Step S14), the CPU 11 consecutively captures a plurality of images at a predetermined cycle (time interval) (Step S16). Details of the consecutive image-capture processing will be described hereafter.

Here, the user aims the digital camera 1 at the recording target landscape by holding it in the vertical direction such that the longer side of the viewing angle is in the vertical direction, and depresses (half-depression to full depression)

the shutter SW at the upper left end of the recording target landscape, as shown in FIG. 3. Then, as indicated by the arrow in FIG. 3, the user moves the digital camera 1 towards the right from the left end where the shutter SW has been depressed (see state #1 in FIG. 4), and after moving it downward at a predetermined position (see state #2 in FIG. 4), moves it towards the left at another predetermined position (see state #3 in FIG. 4). Next, the CPU 11 judges whether or not the consecutive image-capturing has been completed, or in other words, the panoramic imaging has been completed (Step S18). When judged that the consecutive image-capturing has not been completed, the CPU 11 returns to Step S16 and continues the consecutive image-capture processing.

Conversely, when judged that the consecutive image-capturing has been completed, or in other words, the panoramic imaging has been completed (YES at Step S18), the CPU 11 generates a first panoramic image from a plurality of images captured in state #1 while the digital camera 1 is being moved towards the right from the left end, and a second panoramic image from a plurality of images captured in state #3 while the digital camera 1 is being moved towards the left from the right end, and ultimately generates a desired wide-range image by combining the first panoramic image and the second panoramic image (Step S20). Details of the image composition processing will be described hereafter.

Figure 6:
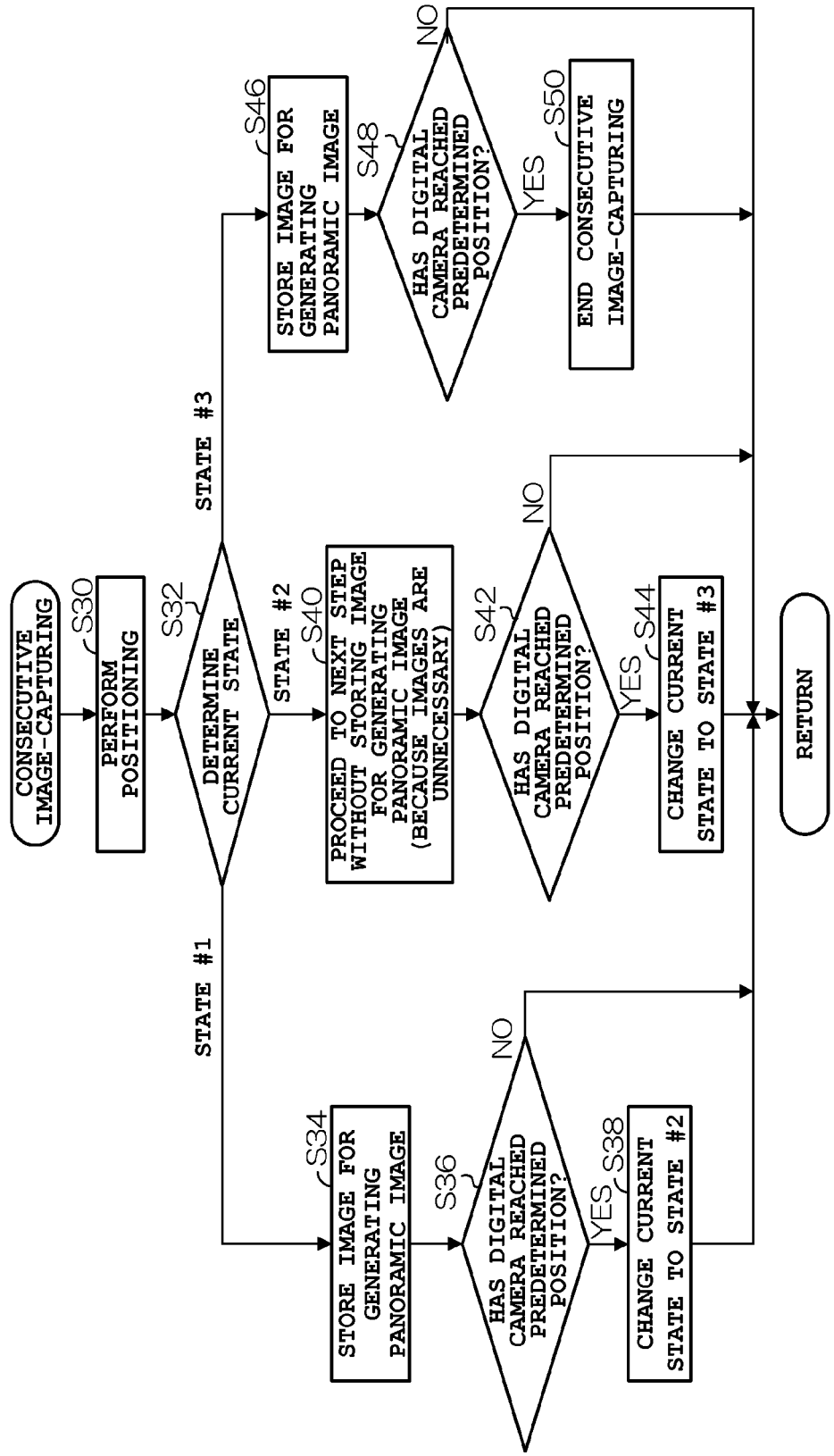
FIG. 6 is a flowchart for explaining the operation of consecutive image-capture processing by the digital camera 1 according to the first embodiment.

FIG. 6 is a flowchart for explaining the operation of the consecutive image-capture processing by the digital camera 1 according to the first embodiment. First, the CPU 11 performs positioning between a current captured image and the preceding captured image (Step S30), and judges whether the current state is state #1, state #2, or state #3 (Step S32).

Then, when judged that the current state is state #1 in which the user is moving the digital camera 1 towards the right from the left end (state #1 at Step S32), the CPU 11 stores the current captured image as an image for generating a panoramic image (Step S34). Next, the CPU 11 judges whether or not the digital camera 1 has reached a predetermined position (in this instance, the right end that is the end position in state #1) (Step S36). When judged that the digital camera 1 has not reached the predetermined position (NO at Step S36), the CPU 11 ends the processing without changing the current state #1 and returns to the main routine shown in FIG. 5.

Hereafter, until the digital camera 1 reaches the predetermined position (in this instance, the right end that is the end position in state #1), the CPU 11 repeats Step S34 and stores captured images as images for generating a panoramic image. Then, when the digital camera 1 reaches the predetermined position (YES at Step S36), the state transitions from state #1 to state #2, and accordingly the CPU 11 changes the current state to state #2 (Step S38).

When the current state transitions to state #2 where the user moves the digital camera 1 downward (state #2 at Step S32), the CPU 11 proceeds to Step S42 without storing a captured image as an image for generating a panoramic image (Step S40), and judges whether or not the digital camera 1 has reached a predetermined position (in this instance, the lower right end that is the end position in state #2) (Step S42). When judged that the digital camera 1 has not reached the predetermined position (NO at Step S42), the CPU 11 ends the processing without changing the current state #2 and returns to the main routine shown in FIG. 5.

Hereafter, until the digital camera 1 reaches the predetermined position (in this instance, the lower right end that is the end position in state #2), the CPU 11 continues the capturing without storing captured images. Then, when the digital camera 1 reaches the predetermined position (YES at Step 42), the state transitions from state #2 to state #3, and accordingly the CPU 11 changes the current state to state #3 (Step S44).

When the current state transitions to state #3 where the user moves the digital camera 1 towards the left from the lower right (state #3 at Step S32), the CPU 11 stores a captured image as an image for generating a panoramic image (Step S46). Next, the CPU 11 judges whether or not the digital camera 1 has reached a predetermined position (in this instance, the left end that is the end position in state #3) (Step S48). When judged that the digital camera 1 has not reached the predetermined position (NO at Step S48), the CPU 11 ends the processing without changing the current state #3 and returns to the main routine shown in FIG. 5.

Hereafter, until the digital camera 1 reaches the predetermined position (in this instance, the left end that is the end position in state #3), the CPU 11 repeats Step S46 and stores captured images as images for generating a panoramic image. Then, when the digital camera 1 reaches the predetermined position (YES at Step S48), the CPU 11 ends the consecutive image-capturing (Step S50).

Consequently, the plurality of images captured in state #1 while the user is moving the digital camera 1 towards the right from the left end, and the plurality of images captured in state #3 while the user is moving the digital camera 1 towards the left from the lower right are acquired. Next, a method for ultimately acquiring a wide-range image using these captured images will be described.

Figure 8A:
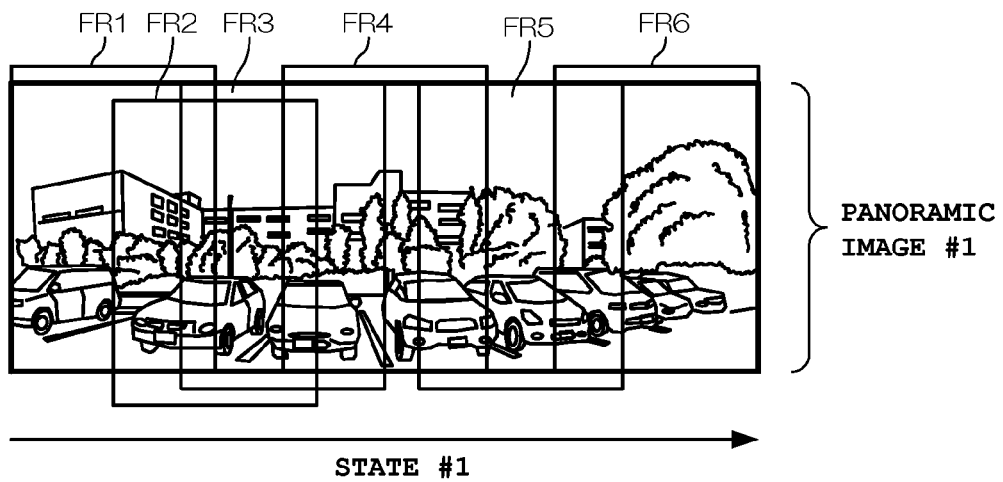
FIG. 8A to FIG. 8C are conceptual diagrams for explaining the operation of the image composition processing by the digital camera 1 according to the first embodiment.
Figure 8B:
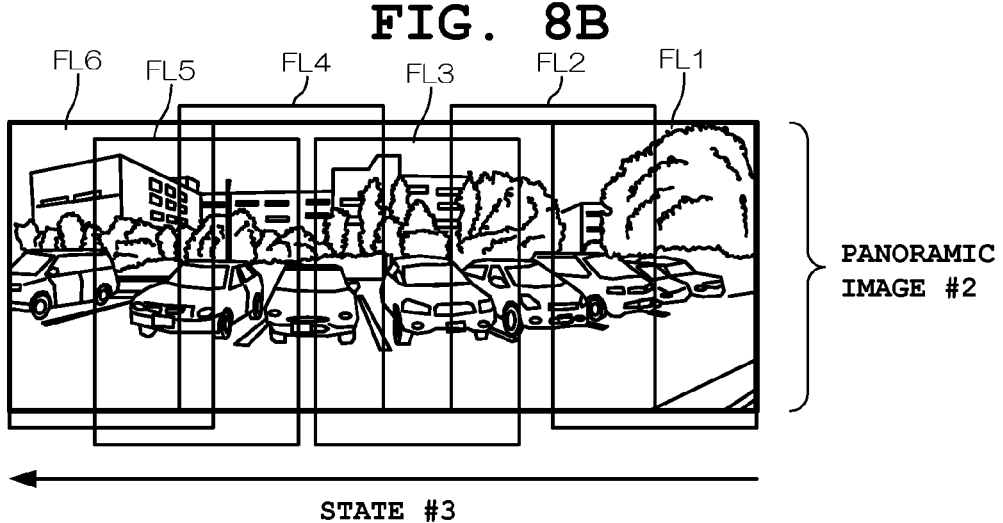
Figure 8C:
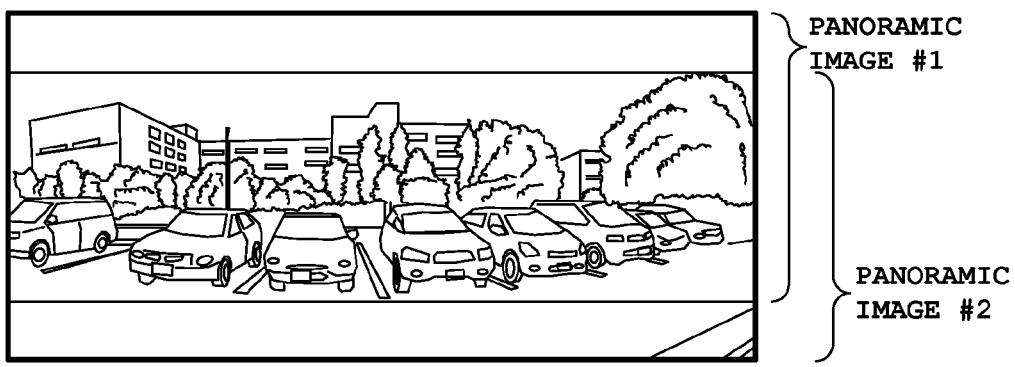

FIG. 7 is a flowchart for explaining the operation of the image composition processing by the digital camera 1 according to the first embodiment. FIG. 8A to FIG. 8C are conceptual diagrams for explaining the operation of the image composition processing by the digital camera 1 according to the first embodiment. First, the CPU 11 acquires an image for generating a panoramic image (Step S60), and identifies the state at the time of the capturing of this image (Step S62). When the state at the time of the capturing of the image is state #1, the CPU 11 performs image composition processing for generating a panoramic image #1 on this image (Step S64).

Next, the CPU 11 judges whether or not the panoramic image composition has been completed (Step S68). When judged that the panoramic image composition has not been completed, the CPU 11 returns to Step S60. Hereafter, the panoramic image #1 is generated by a plurality of images FR1 to FR6 captured in state #1 being combined in a manner that they are partially overlapped with each other (such as by α-blending) as shown in FIG. 8A.

On the other hand, when the acquired image for generating a panoramic image is an image captured in state #3, the CPU 11 performs image composition processing for generating a panoramic image #2 on this image (Step S66). Then, the CPU 11 judges whether or not the panoramic image composition has been completed (Step S68). When judged that the panoramic image composition has not been completed, the CPU 11 returns to Step S60. Hereafter, the panoramic image #2 is generated by a plurality of images FL1 to FL6 captured in state #3 being combined in a manner that they are partially overlapped with each other (such as by α-blending) as shown in FIG. 8B.

When judged that the panoramic image composition has been completed (YES at Step S68), the CPU 11 combines a predetermined area on the lower side of the panoramic image #1 and a predetermined area on the upper side of the panoramic image #2 in a manner that they are partially overlapped with each other (such as by α-blending), and thereby generates a single wide-range image (Step S70), as shown in FIG. 8C.

Note that a configuration may be adopted in the above-described first embodiment in which, when the imaging range of a wide-range image is specified in advance using the key inputting section 16, a panoramic image of a size based on the specified imaging range is generated. Also, a configuration may be adopted in which the imaging ranges of panoramic images to be combined are compared in the image processing section 8, a larger imaging range is adjusted to coincide with the other imaging range, and then the panoramic images are combined to ultimately generate a wide-range image.

According to the above-described first embodiment, images required to generate a wide-range image are easily and efficiently acquired without lens replacement.

B. Second Embodiment

Next, a second embodiment of the present invention will be described.

The second embodiment is characterized in that the change of movement direction from state #1 to state #2 or state #2 to state #3 when the digital camera 1 is moved by the user during panoramic imaging is detected using a camera-based factor, such as a movement amount and information from a direction sensor or an acceleration sensor, or a user-based factor, such as a movement-direction designating operation, a shutter key operation, a user gesture, or sound, as a trigger for the change.

The structure of a digital camera 1 according to the second embodiment is the same as that in FIG. 1, and therefore explanations thereof are omitted. In addition, the main routine in the panoramic imaging mode is the same as that in FIG. 5, and the image composition processing is the same as that in FIG. 7. Therefore, explanations thereof are also omitted.

FIG. 9 is a flowchart for explaining the operation of consecutive image-capture processing by the digital camera 1 according to the second embodiment. FIG. 10 is a conceptual diagram for explaining the operation of the consecutive image-capture processing by the digital camera 1 according to the second embodiment.

In the second embodiment, a flag that is inverted every time a trigger is detected and a state #N (coefficient) that is incremented by one every time a trigger is detected are provided to determine whether the digital camera 1 is currently in state #1, state #2, or state #3 in response to trigger detection. The initial value of the flag is "0", and the flag is inverted every time a trigger is detected. The initial value of the state #N is "1", and the state #N is a coefficient indicating whether the digital camera 1 is currently in state #1, state #2, or state #3. Until a first trigger is detected, the state #N is "1" and indicates state #1. When it is detected, the state #N becomes "2" and indicates state #2. Then, when the next trigger is detected, the state #N becomes "3" and indicates state #3.

First, the CPU 11 performs positioning between a current captured image and the preceding captured image (Step S80), and judges whether or not a trigger has been detected (Step S82). When judged that a trigger has not been detected, the CPU 11 judges that the digital camera 1 has not transitioned from state #1 to state #2, or in other words, the digital camera 1 is in state #1 where it is being moved towards the right from the left end, as shown in FIG. 10. Then, the CPU 11 judges whether or not the flag is "1" (Step S88). In this case, since a trigger has not been detected, the flag is "0" and the state #N is "1".

Then, since the flag is "0" (NO at Step S88), the CPU 11 stores the current captured image as an image for generating a panoramic image in the state #N (=1) (Step S90), and after ending the processing, returns to the main routine shown in FIG. 5. Hereafter, until a trigger is detected, the CPU 11 repeats Step S90 and stores captured images as images for generating a panoramic image in the state #N (=1).

Next, in the transition from state #1 to state #2, when the digital camera 1 is detected to have reached the end of state #1 (when the completion of consecutive image-capturing in a predetermined direction is detected) by a camera-based factor such as a movement amount and information from a direction sensor, or a user-based factor such as a movement direction, a shutter key operation, a user gesture, or sound, the CPU 11 detects this factor as a trigger, as shown in FIG. 10 (YES at Step S82). When the trigger is detected, the CPU 11 inverts the flag (Step S84) and sets the state #N to N+1 (Step S86). In this case, the flag becomes "1" and the state #N becomes "2".

Next, the CPU 11 judges whether or not the flag is "1" (Step S86). In this case, since the flag is "1", the CPU 11 ends the processing without storing a captured image as an image for generating a panoramic image (Step S92), and returns to the main routine shown in FIG. 5. Hereafter, until the next trigger is detected (until the movement direction of the digital camera enters state #3), the CPU 11 repeatedly performs the operations of ending the processing and returning to the main routine shown in FIG. 5 without storing a captured image. Accordingly, images captured in state #2 are not stored.

Next, in the transition from state #2 to state #3, when the digital camera 1 is detected to have reached the end of state #2 (when the completion of consecutive image-capturing in a predetermined direction is detected) by a camera-based factor such as a movement amount and information from a direction sensor, or a user-based factor such as a movement direction, a shutter key operation, a user gesture, or sound, the CPU 11 detects this factor as a trigger, as shown in FIG. 10 (YES at Step S82). When the trigger is detected, the CPU 11 inverts the flag (Step S84) and sets the state #N to N+1 (Step S86). In this case, the flag becomes "0" and the state #N becomes "3".

Next, the CPU 11 judges whether or not the flag is "1" (Step S86). In this case, since the flag is "0", the CPU 11 stores a captured image as an image for generating a panoramic image in the state #N (=3) (Step S90), and after ending the processing, returns to the main routine shown in FIG. 5. Hereafter, until the next trigger is detected, the CPU 11 repeats Step S90 and stores captured images as images for generating a panoramic image in the state #N (=3).

Consequently, the plurality of images captured in state #1 while the user is moving the digital camera 1 towards the right from the left end, and the plurality of images captured in state #3 while the user is moving the digital camera 1 towards the left from the lower right are acquired.

Next, using the same method as the above-described first embodiment (see FIG. 7), a panoramic image #1 is generated by the plurality of images captured in state #1 being combined, and a panoramic image #2 is generated by the plurality of images captured in state #3 being combined. Then, a predetermined area on the lower side of the panoramic image #1 and a predetermined area on the upper side of the panoramic image #2 are combined in a manner that they are partially overlapped with each other (such as by α-blending), whereby a single wide-range image is generated.

According to the above-described second embodiment, images required to generate a wide-range image are easily and efficiently acquired without lens replacement.

C. Third Embodiment

Next, a third embodiment of the present invention will be described.

In the above-described first and second embodiments, the user aims the digital camera 1 at a recording target landscape by holding it in the vertical direction such that the longer side of the viewing angle is in the vertical direction, and depresses (half-depression to full depression) the shutter SW at the upper left end of the recording target landscape. Then, in order to capture all images required to acquire a wide-range composite image, the user moves the digital camera 1 towards the right from the left end at which the shutter SW has been depressed (state #1), and after moving it downward at a predetermined position (state #2), moves it towards the left at another predetermined position (state #3), as indicated by the arrow in FIG. 3. However, the user cannot easily know how to move the digital camera 1 or whether or not the required images have been unfailingly acquired.

For this reason, in the third embodiment, when the user depresses the shutter SW in the panoramic imaging mode, an imaging frame indicating an area that should be captured by the digital camera 1 and a movement direction indicating in which direction the digital camera 1 should be moved are displayed on the image display section 15, whereby the user is guided. Also, in the panoramic imaging mode, an image currently formed in the CCD 5 of the digital camera 1 is displayed on the image display section 15 as a preview image (low resolution). In addition, a composite image generated using preview images is semi-transparently (50% transparency) displayed on the image display section 15.

As described above, in the panoramic imaging mode, an imaging frame indicating an imaging area to be captured next, a movement direction indicating which direction the digital camera 1 should be moved, and a reduced image generated from combined captured images are displayed on the image display section 15. Therefore, the user can easily know in which direction the digital camera 1 should be moved.

Note that the structure of the digital camera 1 according to the third embodiment is the same as that in FIG. 1, and therefore explanations thereof are omitted. In addition, the main routine in the panoramic imaging mode is the same as that in FIG. 5, and the image composition processing is the same as that in FIG. 7. Therefore, explanations thereof are also omitted.

Figure 11:
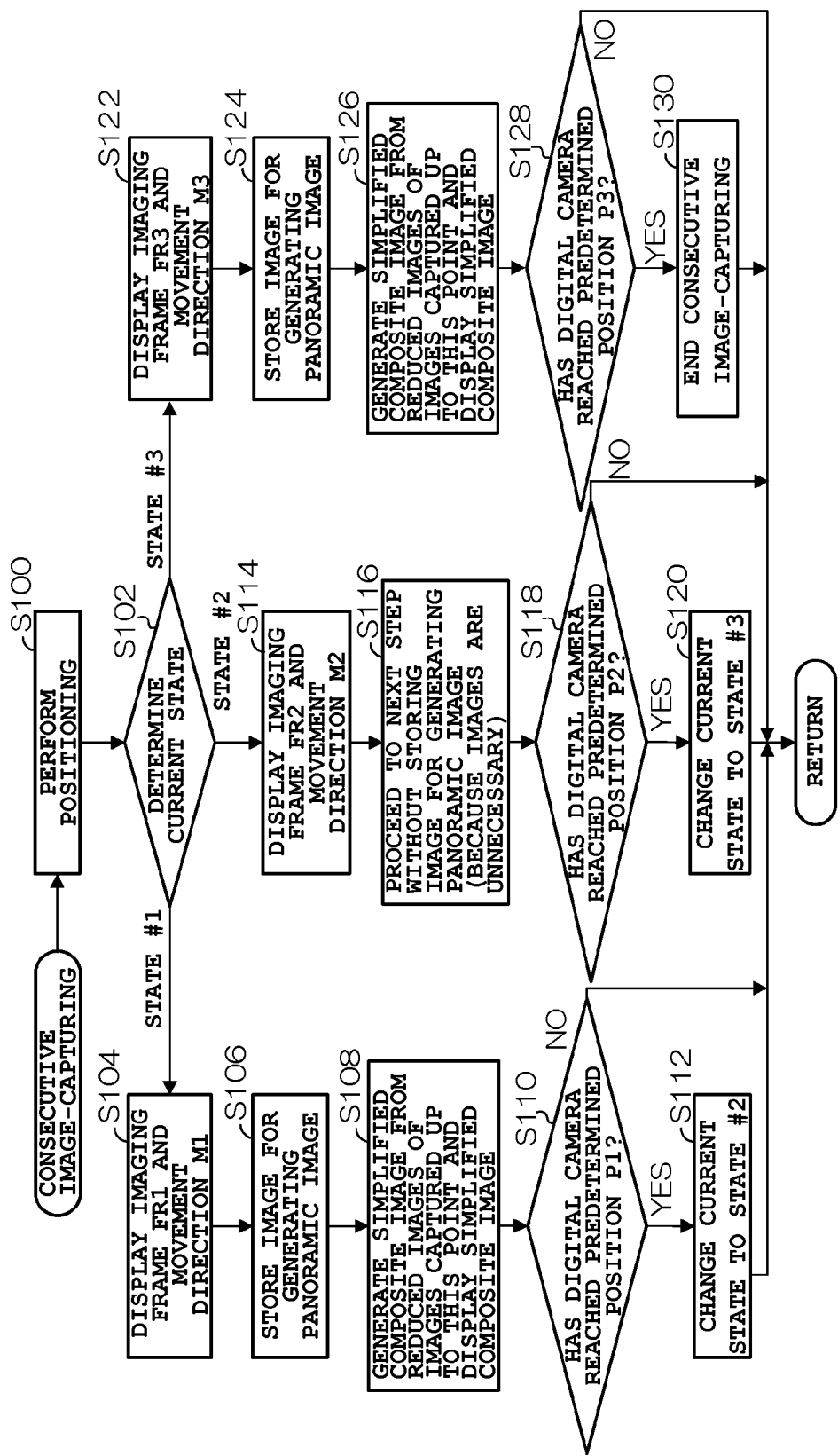
FIG. 11 is a flowchart for explaining the operation of consecutive image-capture processing by a digital camera 1 according to a third embodiment.

FIG. 11 is a flowchart for explaining the operation of consecutive image-capture processing by the digital camera 1 according to the third embodiment. FIG. 12 is a conceptual diagram for explaining the operation of the consecutive image-capture processing by the digital camera 1 according to the third embodiment.

First, the CPU 11 performs positioning between a current captured image and the preceding captured image (Step S100), and judges whether the current state is state #1, state #2, or state #3 (Step S102). When judged that the current state is state #1 where the user is moving the digital camera 1 towards the right from the left end (state #1 at Step S102), the CPU 11 displays an imaging frame FR1 and a movement direction M1 as shown in FIG. 12 (Step S104), and stores the current captured image as an image for generating a panoramic image in state #1 (Step S106). Then, the CPU 11 generates a simplified composite image IMG from reduced images of images captured and stored up to this point, and semi-transparently (50% transparency) displays the simplified composite image IMG (Step S108).

Next, the CPU 11 judges whether or not the digital camera 1 has reached a predetermined position P1 (in this instance, the end position in state #1; see FIG. 12) (Step S110). When judged that the digital camera 1 has not reached the predetermined position P1 (NO at Step S110), the CPU 11 ends the processing without changing the current state #1, and returns to the main routine.

Hereafter, until the digital camera 1 reaches the predetermined position P1, the CPU 11 repeats Step S106 and Step S108, and semi-transparently (50% transparency) displays an updated composite image every time it stores a captured image as an image for generating a panoramic image in state #1. Then, when the digital camera 1 reaches the predetermined position P1 (YES at Step S110), the state transitions from state #1 to state #2, and accordingly the CPU 11 changes the current state to state #2 (Step S112).

Next, when the current state transitions to state #2 where the user moves the digital camera 1 downward from the end position in state #1 (state #2 at Step S102), the CPU 11 displays an imaging frame FR2 and a movement direction M2 as shown in FIG. 2 (Step S114), and proceeds to Step S118 without storing a captured image as an image for generating a panoramic image (Step S116). Then, the CPU 11 judges whether or not the digital camera 1 has reached a predetermined position P2 (in this instance, the end position in state #2; see FIG. 12) (Step S118). When judged that the digital camera 1 has not reached the predetermined position P2 (NO at Step S118), the CPU 11 ends the processing without changing the current state #2 and returns to the main routine shown in FIG. 5.

Hereafter, until the digital camera 1 reaches the predetermined position P2, the CPU 11 continues the capturing without storing captured images. Then, when the digital camera 1 reaches the predetermined position P2 (YES at Step 118), the state transitions from state #2 to state #3, and accordingly the CPU 11 changes the current state to state #3 (Step S120).

Next, when the current state transitions to state #3 where the user moves the digital camera 1 towards the left from state #2 (state #3 at Step S102), the CPU 11 displays an imaging frame FR3 and a movement direction M3 as shown in FIG. 12 (Step S122), and stores a captured image as an image for generating a panoramic image in state #3 (Step S124). Then, the CPU 11 generates a simplified composite image from reduced images of images captured and stored up to this point, and semi-transparently (50% transparency) displays the simplified composite image (Step S126).

Hereafter, until the digital camera 1 reaches a predetermined position P3 (endpoint), the CPU 11 repeats Step S124 and Step S126, and semi-transparently (50% transparency) displays an updated composite image every time it stores a captured image as an image for generating a panoramic image in state #3. Then, when the digital camera 1 reaches the predetermined position P3 (YES at Step S128), the CPU 11 ends the consecutive image-capturing (Step S130).

Consequently, the plurality of images captured in state #1 while the user is moving the digital camera 1 towards the right from the left end, and the plurality of images captured in state #3 while the user is moving the digital camera 1 towards the left from the lower right are acquired.

Next, using the same method as the above-described first and second embodiments (see FIG. 7), a panoramic image #1 is generated by the plurality of images captured in state #1 being combined, and a panoramic image #2 is generated by the plurality of images captured in state #3 being combined. Then, a predetermined area on the lower side of the panoramic image #1 and a predetermined area on the upper side of the panoramic image #2 are combined in a manner that they are partially overlapped with each other (such as by α-blending), whereby a single wide-range image is generated.

Note that, in the above-described third embodiment, it is preferable that a margin MG (extra space) is provided in the imaging frames FR1 to FR3 displayed on the image display section 15, as shown in FIG. 12. That is, the imaging frames should be slightly larger than an image area that is actually captured. As a result of the margin MG being provided, extra space is given to the range in which the digital camera 1 is moved, whereby stress on the user moving the digital camera 1 is reduced.

In addition, although the change of movement direction from state #1 to state #2 or state #2 to state #3 is judged based on whether or not a predetermined position has been reached, the judgment criterion is not limited thereto, and it may be judged using a camera-based factor, such as a movement amount and information from a direction sensor or an acceleration sensor, or a user-based factor, such as a movement-direction designating operation, a shutter key operation, a user gesture, or sound, as a trigger for the change, as in the above-described second embodiment.

According to the above-described third embodiment, a composite image is displayed on the image display section 15 in real-time. In addition, an imaging frame and a movement direction for moving the digital camera 1 are also displayed. Therefore, the user is only required to move the digital camera 1 while viewing the imaging frame and the movement direction. As a result, a plurality of images required to generate a wide-range image that cannot be acquired by a single image-capture operation is easily and efficiently captured, and the wide-range image is easily generated.

Figure 13A:
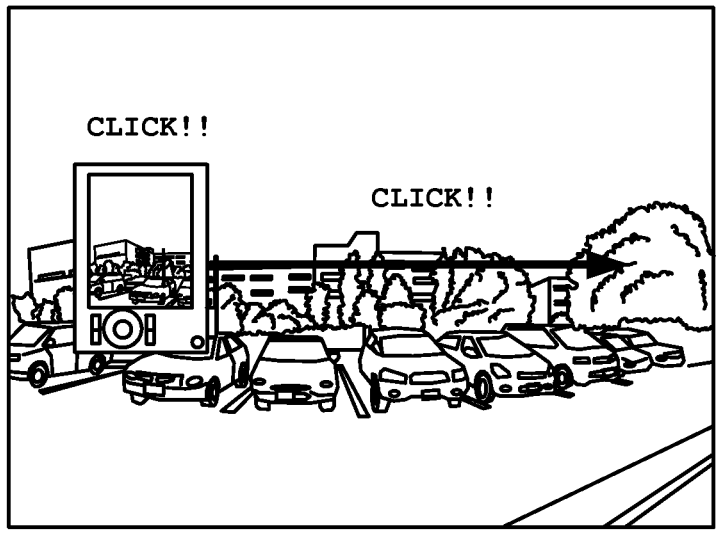
FIG. 13A and FIG. 13B are conceptual diagrams showing other examples of movements of the digital camera 1 during panoramic imaging.
Figure 13B:
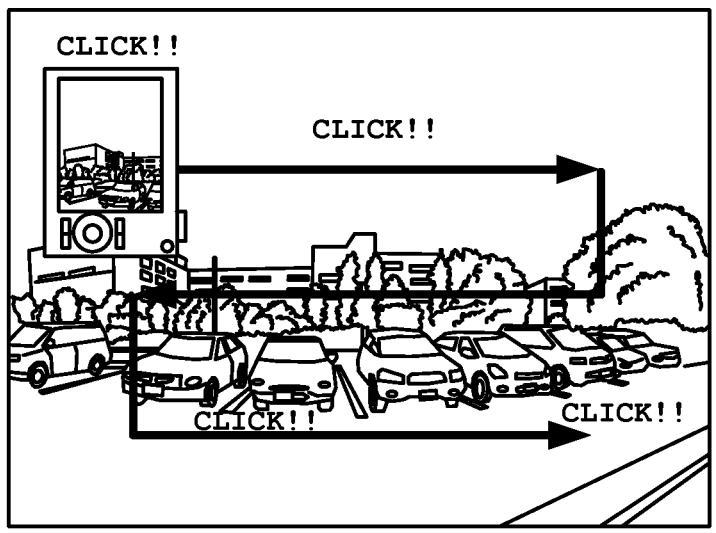
Figure 14:
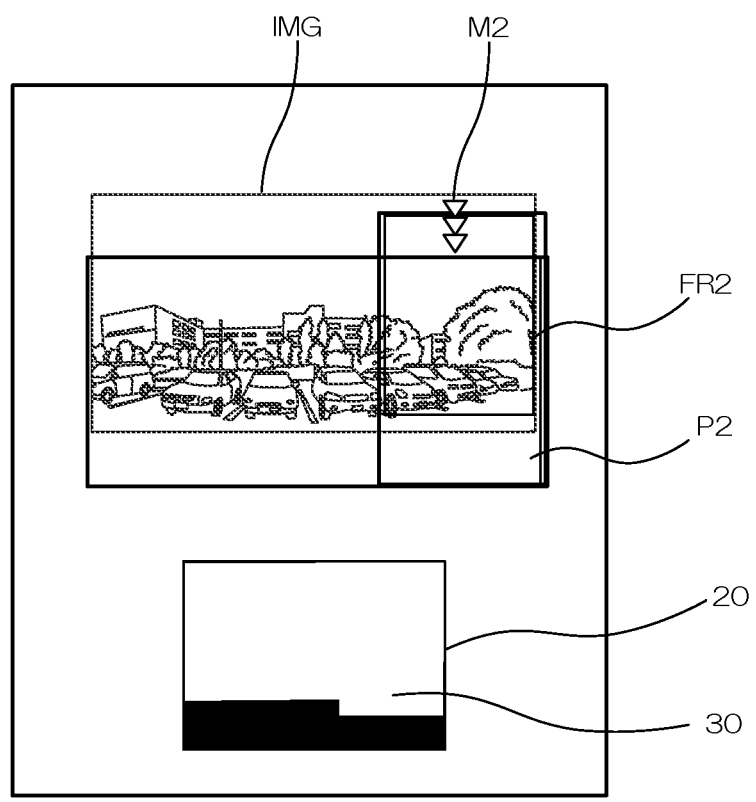
FIG. 14 is a conceptual diagram showing another display example of an imaging frame indicating an imaging range and a movement direction.

Note that, although the digital camera 1 is moved from left to right, top to bottom, and right to left in the panoramic imaging mode in the above-described first to third embodiments, the movement is not limited thereto. For example, a configuration may be adopted in which a plurality of images is captured while the digital camera 1 is being moved in one direction, and a single wide-range image is generated by these images being combined, as shown in FIG. 13A. Alternatively, a configuration may be adopted in which the movement of the digital camera 1 in the horizontal direction is repeated three times or more, such as from left to right, top to bottom, right to left, top to bottom, and left to right, as shown in FIG. 13B.

Also note that, although the imaging frame indicating an imaging area and the movement direction are displayed in the above-described third embodiment, it is not limited thereto, and a configuration may be adopted in which captured portions 30 of the overall frame 20 of a wide-range image that is ultimately generated are colored.

While the present invention has been described with reference to the preferred embodiments, it is intended that the invention be not limited by any of the details of the description therein but includes all the embodiments which fall within the scope of the appended claims.

What is claimed is:

1. An image processing device comprising:
   an imaging device;
   a display; and
   a CPU which is configured to function as:
   an imaging control section which controls the imaging device to perform consecutive image-capturing;
   a wide-range image generating section which generates a wide-range image based on a plurality of images consecutively captured by the imaging device;
   a detecting section which detects a predetermined trigger indicating completion of consecutive image-capturing in one of a plurality of directions by the imaging device;
   a first display control section which displays, on the display section, at least one of a first range to be captured by the imaging device and a first direction for moving the image processing device; and
   a second display control section which newly displays, on the display section, at least one of a second range to be captured by the imaging device and a second direction for moving the image processing device such that the at least one of the first range and the first direction is changed to the at least one of the second range and the second direction, respectively, in response to the predetermined trigger being detected by the detecting section, wherein the second range and the second direction are different from the first range and the first direction, respectively.

2. The image processing device according to claim 1, wherein the CPU is further configured to function as a panoramic image generating section that generates a plurality of panoramic images by combining the plurality of images captured in respective ones of the plurality of directions by the imaging device;
   wherein the wide-range image generating section generates the wide-range image by combining the plurality of panoramic images generated by the panoramic image generating section.

3. The image processing device according to claim 2, wherein
   the detecting detecting section detects a plurality of predetermined triggers indicating completion of consecutive image-capturing in respective ones of the plurality of directions by the imaging device, and
   the panoramic image generating section generates one of the plurality of panoramic images each time the detecting section detects one of the plurality of predetermined triggers.

4. The image processing device according to claim 1, wherein:
   the first display control section displays, on the display, a first frame indicating the first range, and
   the second display control section displays, on the display, a second frame indicating the second range.

5. The image processing device according to claim 1, wherein the CPU is further configured to function as:
   a composite image generating section which generates a composite image corresponding to the wide-range image to be generated by combining the plurality of images consecutively captured by the imaging device;
   wherein the first display control section and the second display control section respectively display on the display, at least one of the first range and the first direction, and at least one of the second range and the second direction, along with the composite image generated by the composite image generating section.

6. The image processing device according to claim 1, wherein the detecting section detects, as the predetermined trigger, either of a movement amount, information from a direction sensor, a change in movement direction, a predetermined instruction operation by a user, an instruction by sound from the user, or an instruction by movement by the user.

7. An image processing method for an image processing device comprising:
   performing consecutive image-capturing by an imaging device;
   generating a wide-range image based on a plurality of images consecutively captured by the imaging device;
   detecting a predetermined trigger indicating completion of consecutive image-capturing in one of a plurality of directions by the imaging device;
   first displaying on a display at least one of a first range to be captured by the imaging device and a first direction for moving the image processing device; and
   second displaying to newly display, on the display, at least one of a second range to be captured by the imaging device and a second direction for moving the image processing device such that the at least one of the first range and the first direction is changed to the at least one of the second range and the second direction, respectively, in response to the predetermined trigger being detected, wherein the second range and the second direction are different from the first range and the first direction, respectively.

8. A non-transitory computer-readable storage medium having stored thereon a program that is executable by a computer of an image processing device that performs image processing, the program being executable by the computer to perform functions comprising:

controlling an imaging device to perform consecutive image-capturing;

generating a wide-range image based on a plurality of images consecutively captured by the imaging device;

detecting a predetermined trigger indicating completion of consecutive image-capturing in one of a plurality of directions by the imaging device;

first displaying on a display at least one of a first range to be captured by the imaging device and a first direction for moving the image processing device; and second displaying to newly display, on the display, at least one of a second range to be captured by the imaging device and a second direction for moving the image processing device such that the at least one of the first range and the first direction is changed to the at least one of the second range and the second direction, respectively, in response to the predetermined trigger being detected, wherein the second range and the second direction are different from the first range and the first direction, respectively.

* * * * *